(12) United States Patent
Aarey Premanath et al.

(10) Patent No.: US 10,880,117 B2
(45) Date of Patent: *Dec. 29, 2020

(54) CONTROL AREA NETWORK (CAN) TRANSCEIVERS WITH AUTOMATIC POLARITY DETECTION

(71) Applicant: TEXAS INSTRUMENTS INCORPORATED, Dallas, TX (US)

(72) Inventors: Abhijeeth Aarey Premanath, Allen, TX (US); Richard Edwin Hubbard, Allen, TX (US); Maxwell Guy Robertson, Dallas, TX (US); Lokesh Kumar Gupta, Bengaluru (IN); Mark Edward Wentroble, Plano, TX (US); Roland Sperlich, Rockwall, TX (US); Dejan Radic, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,614

(22) Filed: Dec. 10, 2019

(65) Prior Publication Data

US 2020/0136860 A1 Apr. 30, 2020

Related U.S. Application Data

(63) Continuation of application No. 15/854,583, filed on Dec. 26, 2017, now Pat. No. 10,560,282.

(Continued)

(51) Int. Cl.
*H04L 12/40* (2006.01)
*H04L 12/12* (2006.01)

(52) U.S. Cl.
CPC ........ *H04L 12/40032* (2013.01); *H04L 12/12* (2013.01); *H04L 12/40013* (2013.01);

(Continued)

(58) Field of Classification Search
CPC .............. H04L 12/40032; H04L 12/12; H04L 12/40089; H04L 2012/40215; H04L 2012/40273
See application file for complete search history.

(56) References Cited

U.S. PATENT DOCUMENTS 10,560,282 B2 * 2/2020 Aarey Premanath ........................ H04L 12/40039
2014/0365693 A1 * 12/2014 Monroe ............ H04L 12/40032 710/105

OTHER PUBLICATIONS

Wan, Xiao-feng et al. "Application and Implementation of CAN Bus Technology in Industry Real-til:ne Data Communication", 2009, College of Information Engineering, Nanchang University (Year: 2009).*

(Continued)

*Primary Examiner* — Henry Tsai
*Assistant Examiner* — John B Roche
(74) *Attorney, Agent, or Firm* — John R. Pessetto; Charles A. Brill; Frank D. Cimino

(57) ABSTRACT

Two CAN bus transceivers utilized in a single integrated circuit package with the CAN bus connections between the two transceivers being inverted. Thus, one transceiver is connected to the CAN bus high and low lines while the other transceiver is connected to the CAN bus low and high lines. Both transceivers power up in a standby condition and each transceiver is monitoring for wake up signals on the CAN bus. The transceiver that is correctly connected to the CAN bus detects wake up signals. When the wake up signals are detected at that transceiver, that transceiver is brought to full operating state and the other transceiver is placed in a full standby condition. Additional input resistance is provided with each transceiver to maintain the proper input resistance for the integrated circuit.

9 Claims, 10 Drawing Sheets

Related U.S. Application Data

(60) Provisional application No. 62/513,302, filed on May 31, 2017.

(52) U.S. Cl.
CPC .. *H04L 12/40039* (2013.01); *H04L 12/40176* (2013.01); *H04L 2012/40215* (2013.01); *H04L 2012/40273* (2013.01)

(56) References Cited

OTHER PUBLICATIONS

Xiao-feng Wan, et al. "Application and Implementation of CAN Bus Technology in Industry Real-Time Data Communication," 2009 International Conference on Industrial Mechatronics and Automation. 2009 IEEE.
Magnus-Maria Hell. "The New Wake-up Pattern for a Robust System." CAN in Automation. ICC 2017.
TCAN1042 Fault Protected CAN Transceiver with CAN FD. Texas Instruments, SLL SES7C—Mar. 2016—Revised May 2017.

\* cited by examiner

CONTROL AREA NETWORK (CAN) TRANSCEIVERS WITH AUTOMATIC POLARITY DETECTION

CROSS REFERENCE TO RELATED APPLICATIONS

This continuation application claims priority to U.S. patent application Ser. No. 15/854,583, filed Dec. 26, 2017, which application claims the benefit under 35 U.S.C. § 119(e) of U.S. Provisional Patent Application Ser. No. 62/513,302, filed May 31, 2017, both of which are hereby incorporated herein by reference in their entirety.

BACKGROUND

1. Field

The present design relates to automotive systems, and more particularly to controller area network (CAN) bus environments.

2. Description of the Related Art

Modern automobiles are extremely complex. There are numerous controller modules inside a given car to control the myriad of functions that exist in the car. For example, there are engine controller modules, transmission controller modules, door controller modules, light controller modules, body controller modules and so on. To avoid immense wiring issues, a CAN bus is used to interconnect the various controller modules. The CAN bus is a two wire bus, one wire referred to as the high line and the other referred to as the low line. Each of the modules has a differential receiver to connect to the CAN bus high and low lines. All of the modules, when correctly connected to the CAN bus, drive signals according to the defined standard so that the various modules can communicate. However, in some cases the CAN bus wires from a given module are unintentionally reversed. When this occurs, that module cannot communicate with the remaining modules. The module cannot then perform its function and cannot be detected from tools connected to the CAN bus. Therefore, diagnosis of the problem is difficult and functionality is lost.

Some attempts have been made to address the problem but they are more complicated, require more components and require more power. It would be desirable to obtain a solution which does not require additional components, does not require more power and will automatically operate correctly.

SUMMARY

Examples allow two CAN bus transceivers to be utilized in a single integrated circuit package with the CAN bus connections between the two transceivers being inverted. Thus, one transceiver is connected to the CAN bus high and low lines while the other transceiver is connected to the CAN bus low and high lines. In operation, both transceivers power up in a standby mode and each transceiver is monitoring for wake up signals on the CAN bus. The transceiver that is correctly connected to the CAN bus detects wake up signals. When the wake up signals are detected at that transceiver, that transceiver is brought to full operating state and the other transceiver is placed in a full standby mode.

Therefore, in operating mode one transceiver is in full operating state and the other transceiver is in full standby mode. As the standby mode consumes very low power, only nominal additional power is required. Only a single integrated circuit package is needed to provide reverse connection protection on the CAN bus and yet does not require additional components or power.

BRIEF DESCRIPTION OF THE FIGURES

For a detailed description of various examples, reference will now be made to the accompanying drawings in which.

DETAILED DESCRIPTION

Figure 1A:
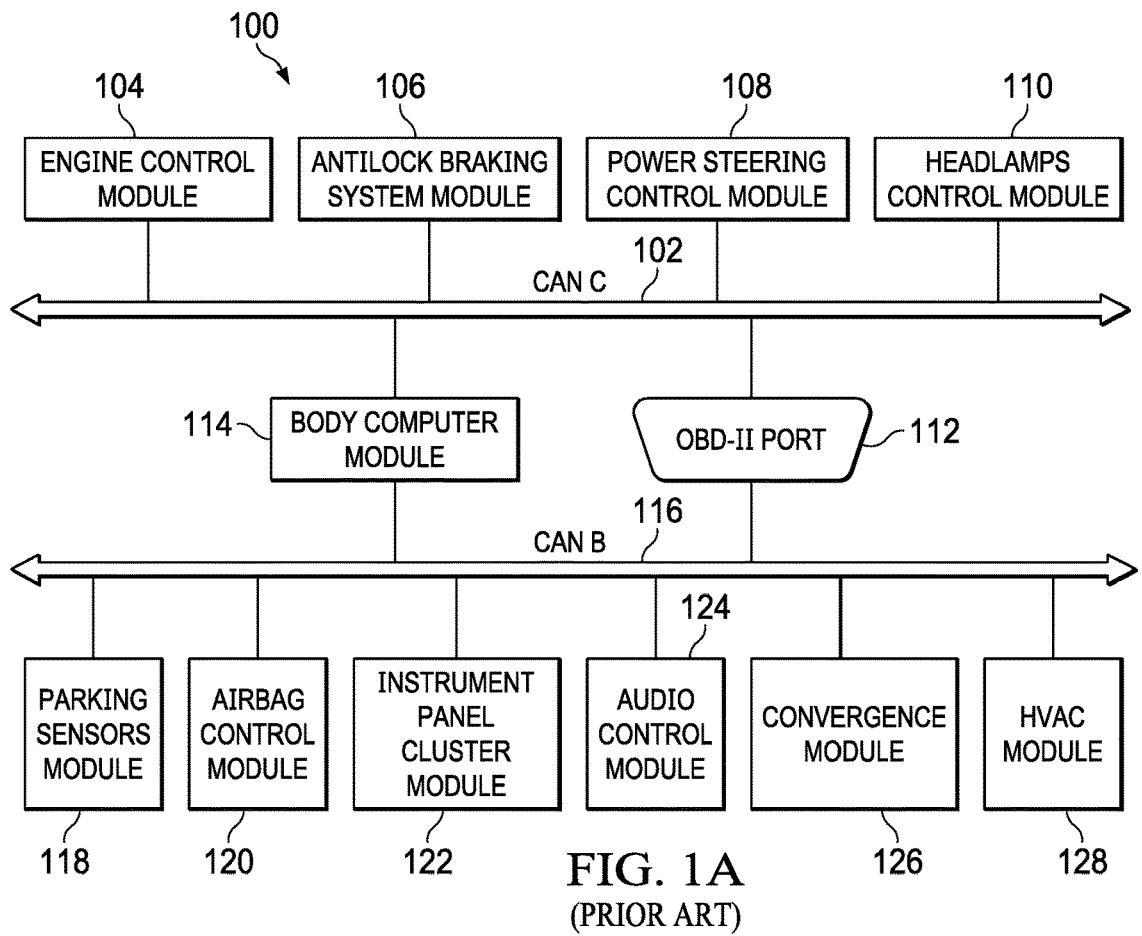
FIG. 1A is a block diagram of the control systems of an automobile.

Referring now to FIG. 1A, a block diagram of the control system 100 of an automobile is illustrated. A CAN bus 102 in mode C has connected to it an engine control module 104, an antilock braking system module 106, a power steering control module 108, a headlamps control module 110, an OBD-II port 112 and a body computer module 114. A CAN bus 116 in mode B is connected to the OBD-II port 112 and the body computer module 114 and has connected to it a parking sensors module 118, an airbag control module 120, an instrument contact panel cluster module 122, an audio control module 124, a convergence module 126 and an HVAC module 128. It is understood that these are just exemplary modules and additional modules or fewer modules could be present in a particular car, as could more or less CAN buses or alternative or additional buses.

Figure 1B:
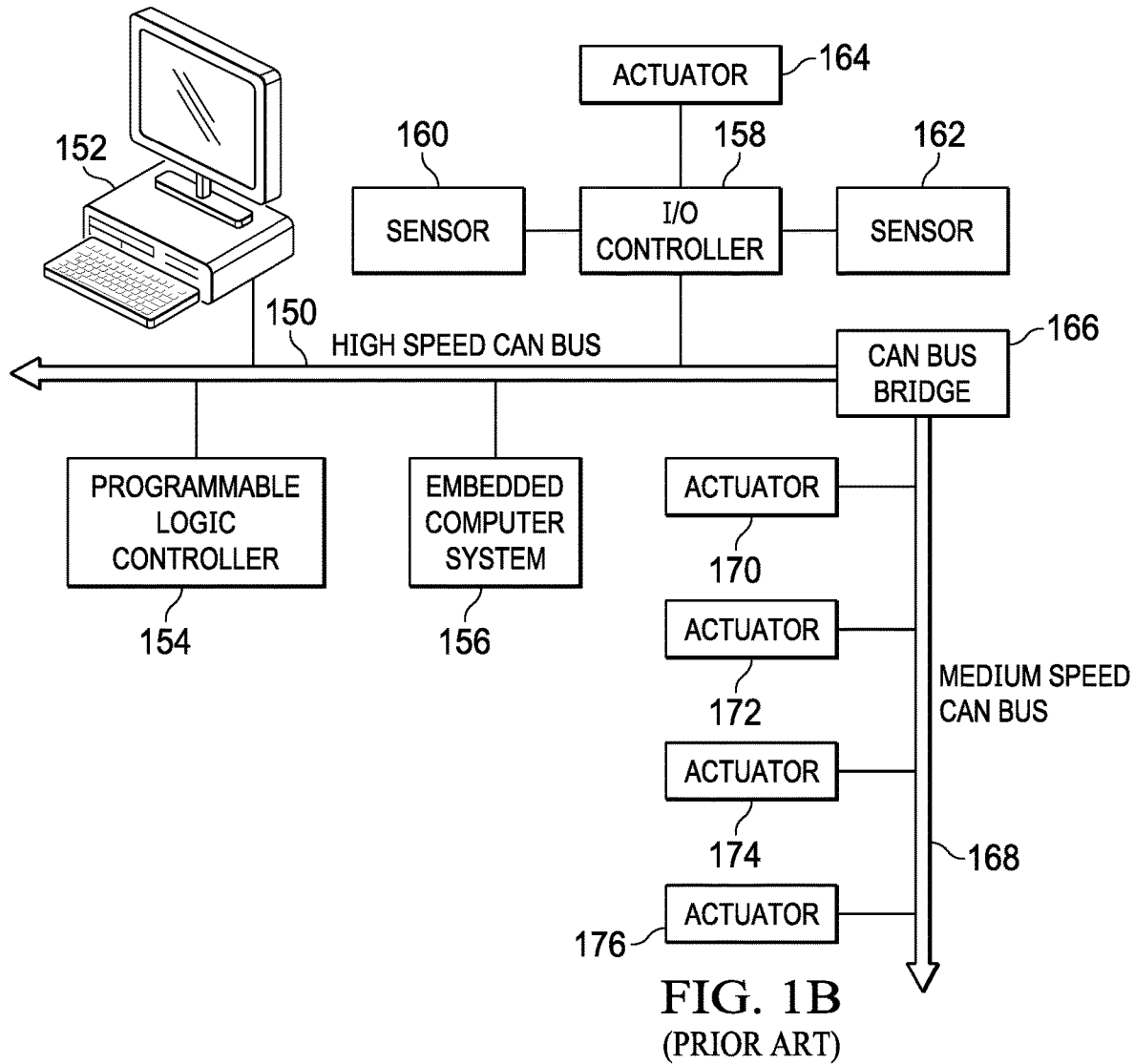
FIG. 1B is a block diagram of an industrial automation system.

FIG. 1B is a block diagram of an industrial automation system according to the prior art. While automobiles may be the best known and most widespread use of the CAN bus, CAN buses are used in industrial and residential environments as well. Indeed, the industrial and residential environments are more likely to have reversed CAN bus connections than the automotive environment because of the need to individually connect each CAN bus controller. A high speed CAN bus 150 forms the interconnect between a personal computer 152, a programmable logic controller (PLC) 154, an embedded computer system 156 and an input/output controller 158. Sensors 160, 162 are connected to the input/output controller 158, as is an actuator 164. The sensors 160, 162 and actuator 164 are conventional and cannot be connected directly to a CAN bus. A CAN bus bridge 166 is connected to the high speed CAN bus 150 and provides a medium speed CAN bus 168. Actuators 170, 172 and sensors 174, 176 are directly connected to the medium speed CAN bus 168. This configuration allows the personal computer 152 to program the PLC 154 and the embedded computer system 156. The PLC 154 and the embedded computer system 156 run the control algorithms used to automate the industrial environment or the home.

Figure 2:
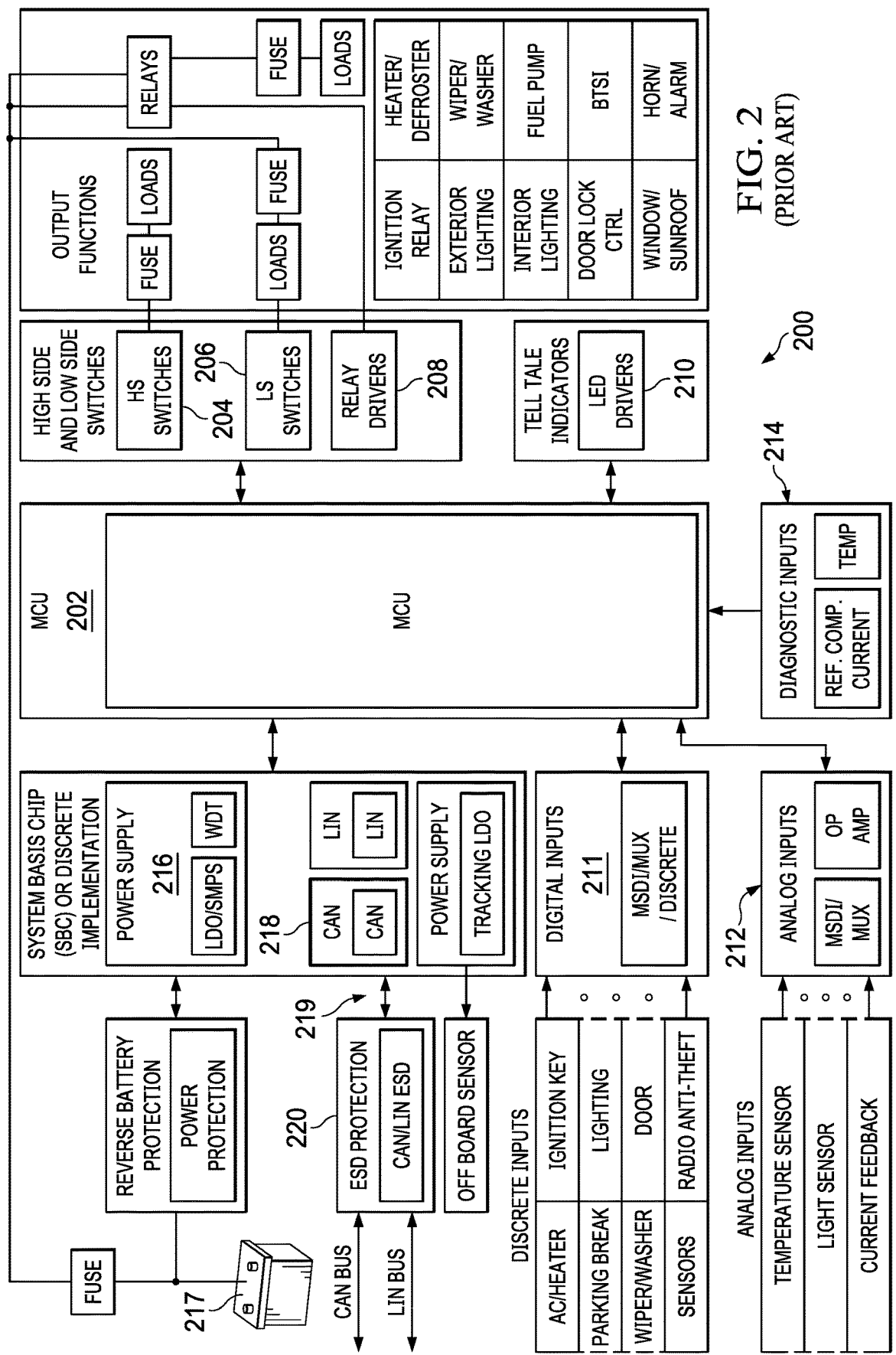
FIG. 2 is a block diagram of a typical controller module is used in FIG. 1A.

FIG. 2 is a block diagram of an exemplary controller module 200 according to the prior art. A microcontroller 202 handles controller operation for the module 200. High side switches 204, low side switches 206 and relay drivers 208 are connected to the microcontroller 202 to provide output control operations. A series of LED drivers 210 are connected to the microcontroller 202 to provide driver indications. Exemplary output functions include ignition relay, heater/defroster, exterior lighting, interior lighting, wiper/washer, fuel pump, door locks, window/sunroof and horn/alarm. A plurality of digital inputs 211 are provided to the microcontroller 202. Exemplary digital inputs include air conditioning/heater controls, parking brake activation, wiper/washer controls, the ignition key setting, lighting controls, door closure, radio antitheft and various sensors. Analog inputs 212 are connected to the microcontroller 202 to provide input of various analog items necessary for proper operation. Some of these items include temperature and current feedback. Diagnostic inputs 214, such as a reference voltage and temperature, are connected to the microcontroller 202 to perform diagnostics and maintain state as necessary.

A power supply 216 is connected to an automobile battery 217 to provide power to the module 200. A CAN bus transceiver 218 is connected to the microcontroller 202 and to the CAN bus via CAN bus electrostatic discharge (ESD) protection 220 and CAN bus connector 219. The CAN bus transceiver 218 allows the microcontroller 202 to communicate with the other modules present in the automobile.

Figure 3:
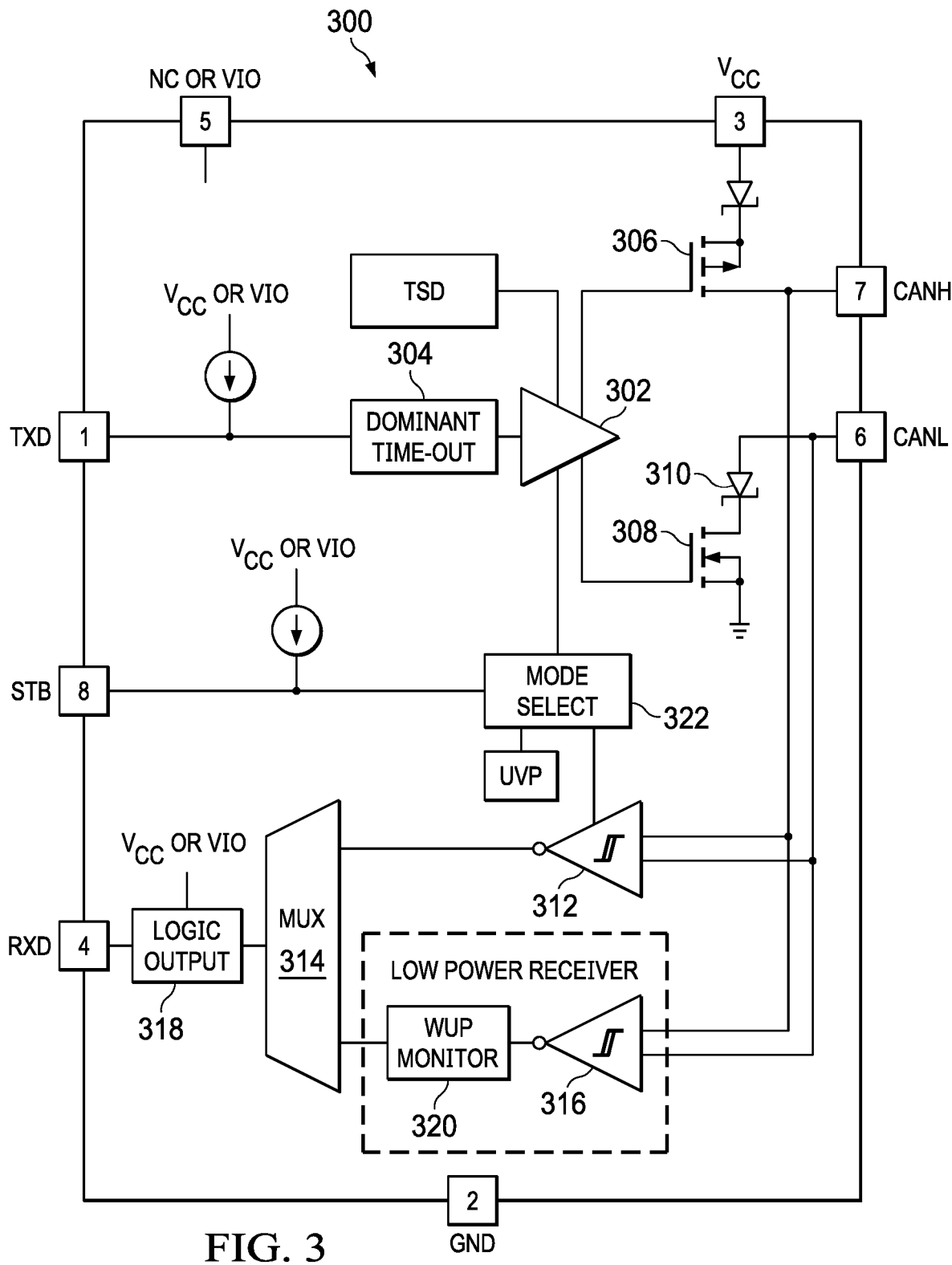
FIG. 3 is a block diagram of a CAN bus transceiver.

FIG. 3 is a block diagram of a CAN bus transceiver integrated circuit 300, such as the TCAN1042 from Texas Instruments® according to the prior art. The transceiver integrated circuit 300 is contained in an eight pin integrated circuit. An output driver 302 receives its input from a dominant timeout block 304. The dominant timeout block 304 prevents the driver 302 from providing a continuous dominant signal to the CAN bus, which would interfere with operations on the CAN bus. The dominant timeout block 304 is connected to a transmit input of the transceiver integrated circuit 300. The high or positive output of the driver 302 is connected to a P-channel MOSFET 306, which is connected to a High CAN bus pin. The low or negative output of the driver 302 is connected to an N-channel MOSFET 308, which is connected through a protection diode 310 to a Low CAN bus pin. A differential receiver 312 has its inputs connected to the CAN bus high and Low CAN bus pins and its output connected to one input of a multiplexer 314. A low-power differential receiver 316 also has its inputs connected to the CAN bus high and Low CAN bus pins and has its output connected to a Wake up Pattern (WUP) monitor block 320. The WUP monitor block 320 monitors signals that are present on the CAN bus to detect that a signal is present so that the transceiver integrated circuit 300 can exit standby mode and enter normal or operational mode. The output of the WUP monitor block 320 is connected to a second input of the multiplexer 314. The output of the multiplexer 314 is provided to a logic output level block 318, whose output is connected to a receive pin of the transceiver integrated circuit 300. A standby input is provided to a mode select block 322. When the standby signal is at a high state, the transceiver integrated circuit 300 is in a low-power or standby mode, with only the low power differential receiver 316 and WUP monitor block 320 active. The driver 302 and the receiver 312 are in a powerdown condition. The mode select block 320 has outputs to the driver 302 and the receiver 312 to place them in their low-power condition.

Figure 4:
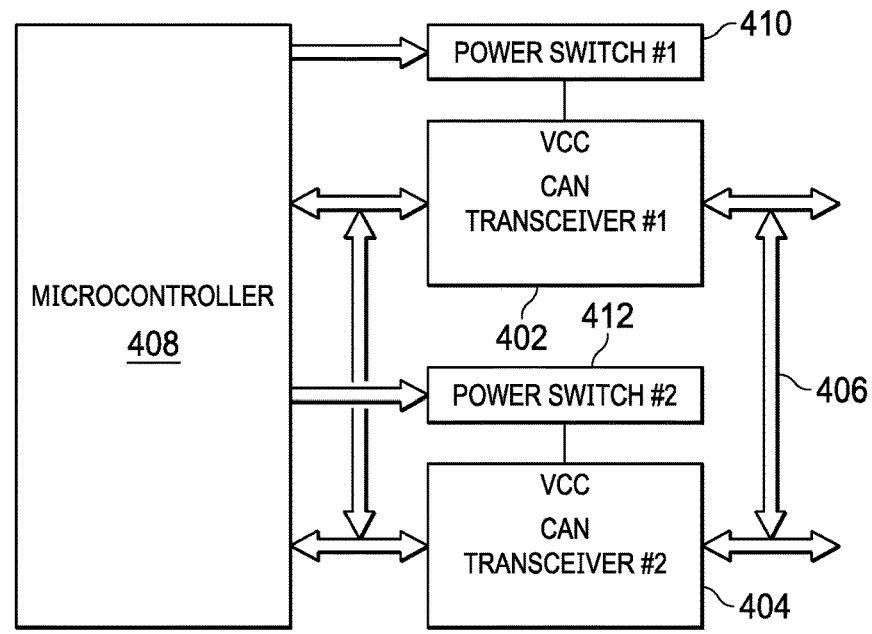
FIG. 4 is a block diagram of a design to provide reverse connection operation.

FIG. 4 is a block diagram of a prior art solution to the reversed CAN bus connection problem. A first CAN bus transceiver integrated circuit 402 is connected to the CAN bus in a first configuration, such as the high pin is connected to the CAN bus high line and the low pin is connected to the CAN bus low line. A second CAN bus transceiver integrated circuit 404 is connected to the CAN bus 406 in an inverted manner, such that the Low CAN bus pin is connected to the CAN bus high line and the High CAN bus pin is connected to the CAN bus low line. The transceiver integrated circuits 402 and 404 are connected to a microcontroller 408 to provide their input signals and to receive the output signals. A first power switch 410 is connected between power and a power input of the first transceiver integrated circuit 402 and is controlled by the microcontroller 408. A second power switch 412 is connected between power and a power input of the second transceiver integrated circuit 404 and is also controlled by the microcontroller 408. Because of the power switches 410 and 412, the microcontroller 408 can operate one or the other of the two transceiver integrated circuit 402 and 404 until the microcontroller 408 receives proper signaling indications from the CAN bus. Once signaling has been received from a transceiver integrated circuit 402 or 404, the power switch 410, 412 for the other transceiver integrated circuit 402, 404 is turned off so that the transceiver integrated circuit 402, 404 is an powered off condition.

While this solution does provide for reversal of the CAN bus lines, it does it at the cost of numerous additional components, namely the two power switches and a second transceiver integrated circuit, and also has impedance and voltage level concerns on the CAN bus 406 because of the impedance of the second transceiver integrated circuits, even when the second transceiver integrated circuits that is turned off. Therefore, the solution is more expensive, takes up more space and provides potential CAN bus signaling issues and thus is not desirable.

Figure 5:
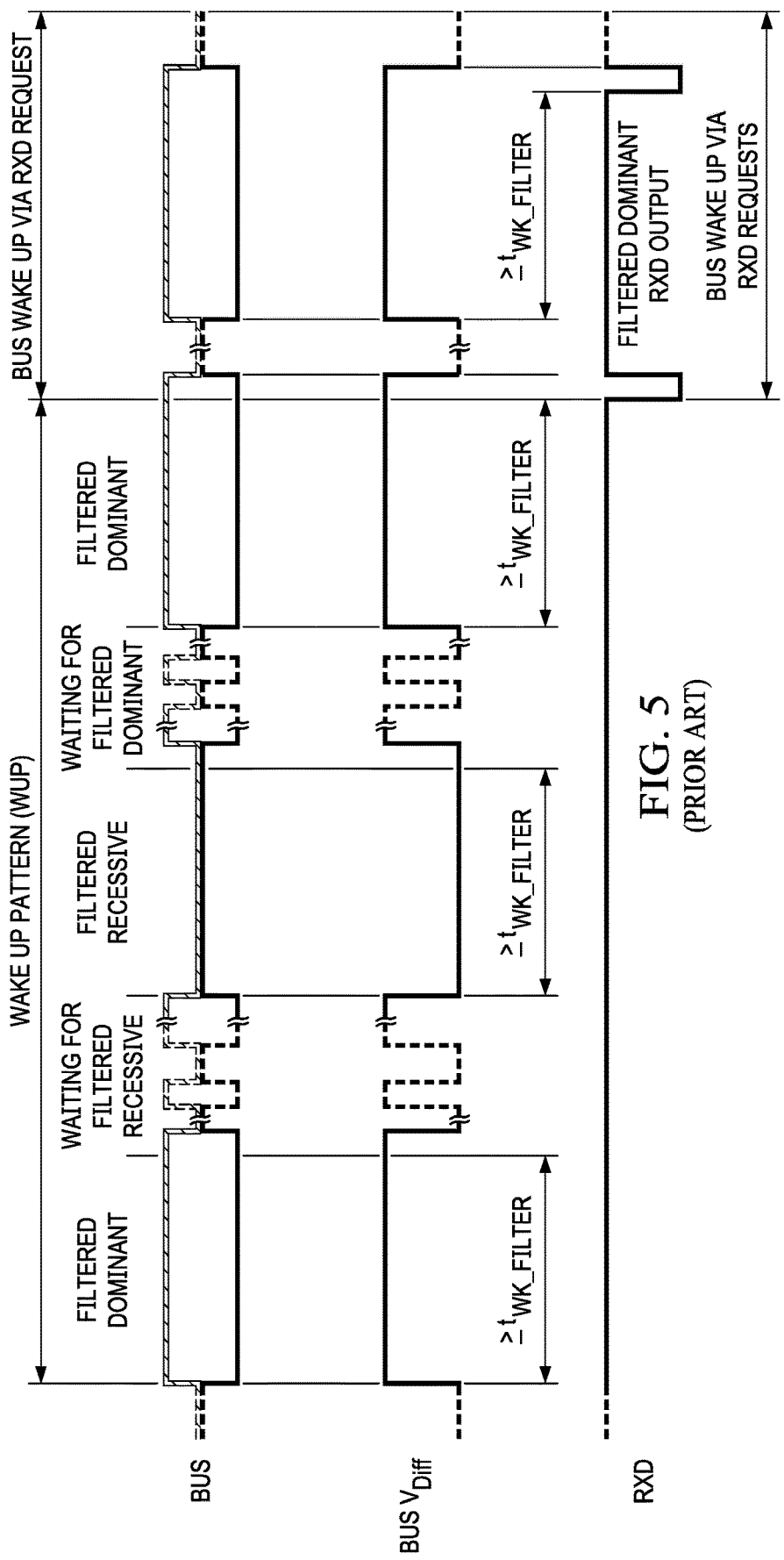
FIG. 5 is a timing diagram of the wake up pattern on a CAN bus.

ISO 11898-2:2016 is a standard that specifies a protocol for compliant CAN buses. The standard indicates that the wake up pattern on the CAN bus is two consecutive dominant bus levels of at least a filter time separated by a recessive bus level of at least filter time. The filter time according to the specification is anywhere from 0.5 µs to 5 µs. When this pattern is present on a CAN bus, a wake up pattern detector, such as the WUP monitor block 320, determines that an active CAN bus is present and therefore the transceiver should exit low-power or standby mode. The wake up pattern is illustrated in FIG. 5.

Figure 6:
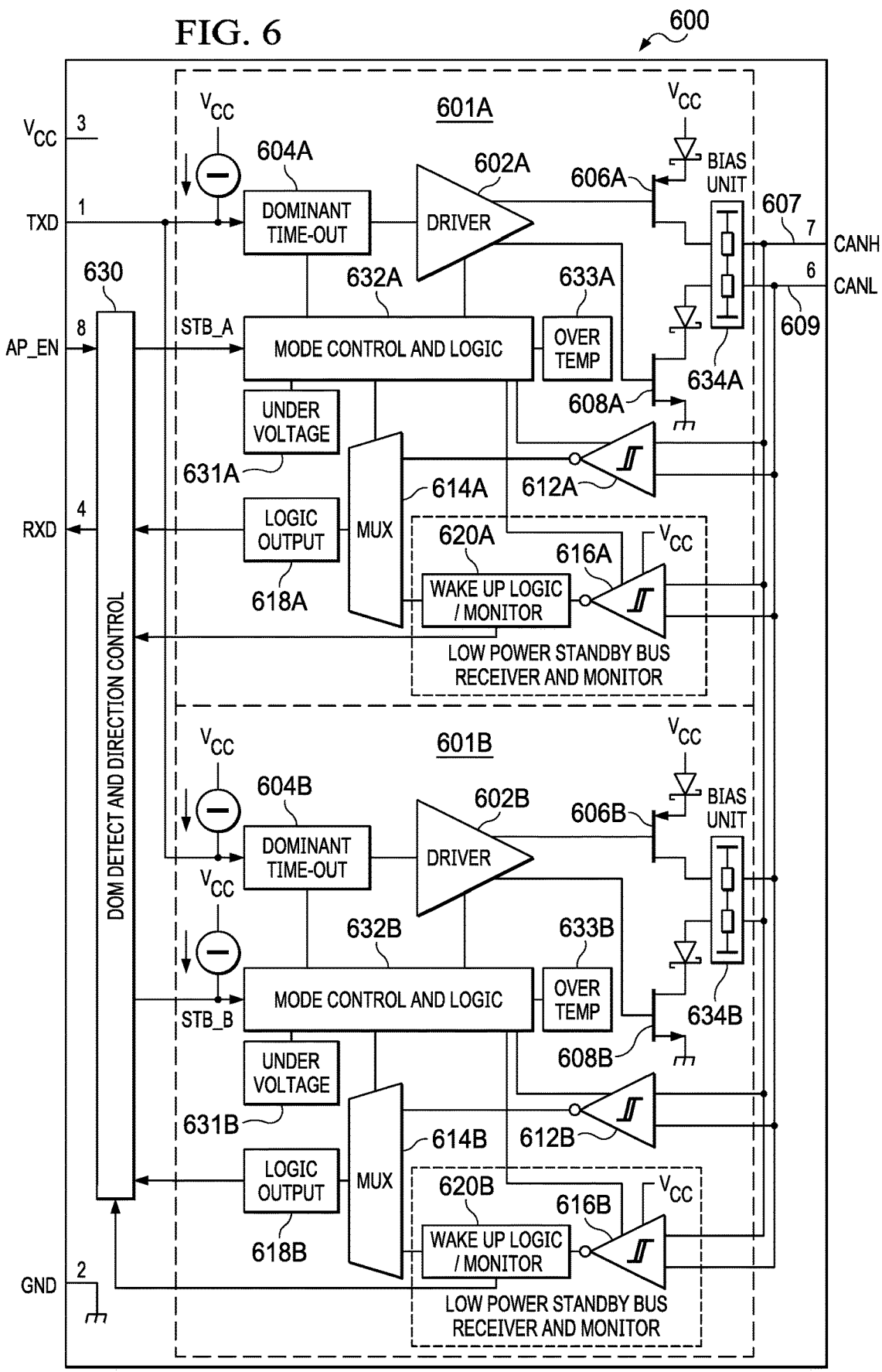
FIG. 6 is a block diagram of a CAN bus transceiver integrated circuit.

FIG. 6 is a block diagram of a CAN bus transceiver integrated circuit 600 with reverse connection protection. The transceiver integrated circuit 600 is also commonly contained in an eight pin integrated circuit, with transmit and receive data pins, high and low CAN bus pins and an automatic polarity enable pin. The transceiver integrated circuit 600 contains duplicated logic present in the transceiver integrated circuit 300, namely transceivers 601A and 601B with one of the transceivers 601A, 601B connected inversely to the CAN bus from the other. Additional mode and control logic blocks 632A, 632B and detection and direction control block 630 are provided. Further, bias driving circuitry 634A, 634B is provided to compensate for the presence of the two transceivers 601A and 601B. For simplicity, element numbering from FIG. 3 is applied to FIG. 6 with a change in the hundreds digit to 6 and with suffixes of the letter A or B to indicate the two transceivers 601A and 601B. Therefore, as with the transceiver integrated circuit 300, driver 602A is connected to MOSFETs 606A and 608A, and driver 602B is connected to MOSFETs 606B and 608B. The high output of driver 602A is connected to a MOSFET 606A, which is connected to the CAN bus pin via a high CAN bus connection 607. The low output of driver 602A is connected to a MOSFET 608A, which is connected to the low CAN bus pin by a low CAN bus connection 609. Driver 602B is connected in a reverse fashion. The high output of driver 602B is connected to a MOSFET 606B, which is connected to the low CAN bus pin via low CAN bus connection 609, while the low output of driver 602B is connected to a MOSFET 608B, which is connected to the high CAN bus pin via the high CAN bus connection 607. Dominant timeout blocks 604A, 604B are present and connected to the inputs of the drivers 602A, 602B and receive their input from a transmit input pin of the transceiver integrated circuit 600.

Receiver 612A has its high input connected to the high CAN bus pin via the high CAN bus connection 607 and its low input connected to the low CAN bus pin of the transceiver integrated circuit 600 via the low CAN bus connection 609. The receiver 612B has its high input connected to the low CAN bus pin via the low CAN bus connection 609 and has its low input connected to the high CAN bus pin via the high CAN bus connection 607. Therefore receiver 612A is connected in one direction or polarity and receiver 612B is connected in the other direction or polarity. The outputs of receivers 612A and 612B are connected to multiplexers 614A and 614B, respectively. The low power wake up receivers 616A, 616B are connected in the same manner as the related receivers 612A, 612B and provide their outputs to wake up (WUP) logic monitor blocks 620A and 620B, respectively. The outputs of the WUP logic monitor blocks 620A, 620B are provided to multiplexers 614A, 614B. The outputs of the multiplexers 614A, 614B are provided to logic outputs 618A, 618B.

A detection and direction control block 630 is provided to receive the outputs of the logic outputs 618A, 618B and outputs of the WUP logic monitor blocks 620A, 620B and to provide the receive output of the transceiver integrated circuit 600 and internal standby signals. The internal standby signals STB_A and STB_B are provided to mode and control logic blocks 632A, 632B, respectively. Under voltage module 631A, 631B and overtemperature module 633A, 633B have outputs connected to the mode and control logic bocks 632A, 632B to allow for standby for the respective error conditions.

Figure 7:
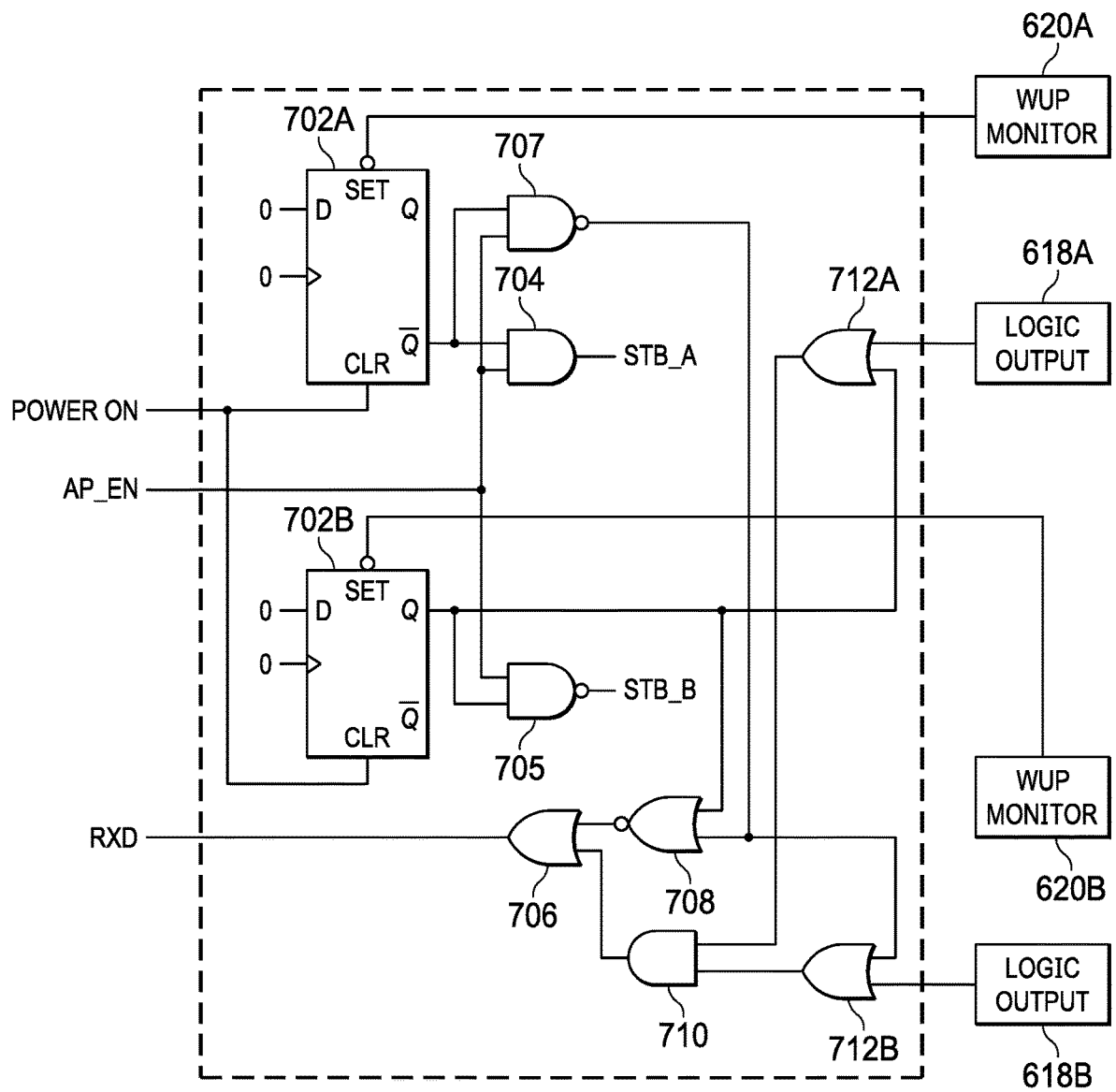
FIG. 7 is a block diagram of the detect and direction control logic of the transceiver integrated circuit of FIG. 6.

FIG. 7 illustrates an example of the detection and direction control block 630. Set and clear flip-flops 702A, 702B store the active or standby state information for the respective transceivers 601A, 601B. The flip-flops 702A, 702B are cleared by a power on signal, which is a pulse provided after the transceiver integrated circuit 600 is powered on. An output from the WUP logic monitor 620A is provided to the set input of flip-flop 702A, while an output from the WUP logic monitor block 620B is provided to the set input of the flip-flop 702B. The outputs of the WUP logic monitor blocks 620A, 628B are low going pulses when a wake up pattern is detected. The Q output of the flip-flops 702A, 702B is then the polarity detection enable indication for the respective transceiver 601A, 601B. The $\overline{Q}$ output of the flip-flop 702A is one input of an AND gate 704. The second input of the AND gate 704 is an AP_EN or automatic polarity enabled signal received from the automatic polarity enable pin. Then the AP_EN signal is high, automatic selection of the transceiver 601A, 601B is enabled. When the AP_EN signal is low, then transceiver 601A is always enabled and in normal mode and transceiver 601B is in standby mode. This operation is explained in more detail below. The output of the AND gate 704 is the STB_A signal provided to the mode and control logic block 632A. The AP_EN signal and the Q output of the flip-flop 702B are the inputs to a NAND gate 705. The output of the NAND gate 705 is the STB_B signal provide to the mode and control block 632B. The AP_EN signal is provided as one input to a NAND gate 707. The other input to the NAND gate 707 is the $\overline{Q}$ output of the flip-flop 702A.

The RXD or receive data signal output on the receive data pin is provided as the output of an OR gate 706. One input of the OR gate 706 is provided by a NOR gate 708. The inputs to the NOR gate 708 are the Q output of the flip-flop 702B and the output of the NAND gate 707. When the flip-flops 702A, 702B are both cleared and the AP_EN signal is in automatic polarity detect mode, the output of the NOR gate 708 is high, so that the RXD signal remains high until polarity is detected. When polarity has been detected, the output of the NOR gate 708 goes low, so that the output of the OR gate 706 is controlled by the second input. That second input is provided by an AND gate 710. One input of the AND gate 710 is provided by an OR gate 712A. The inputs of OR gate 712A are the output of the logic output 618A and the Q output of the flip-flop 702B. The second input of the AND gate 710 is provided by an OR gate 712B. The inputs of the OR gate 712B are the output of the logic output 618B and the Q output of the flip-flop 702A. Because of the cross-connection of the flip-flops 702A, 702B and the logic outputs 618A, 618B, the output of the enabled transceiver 601A 601B controls the RXD signal as the output of the standby transceiver 601A, 601B is masked by the OR gate 712A, 712B. The OR gate 706, the NOR gate 708, the AND gate 710 and the OR gates 712A, 712B are thus the output circuitry.

Figure 8A:
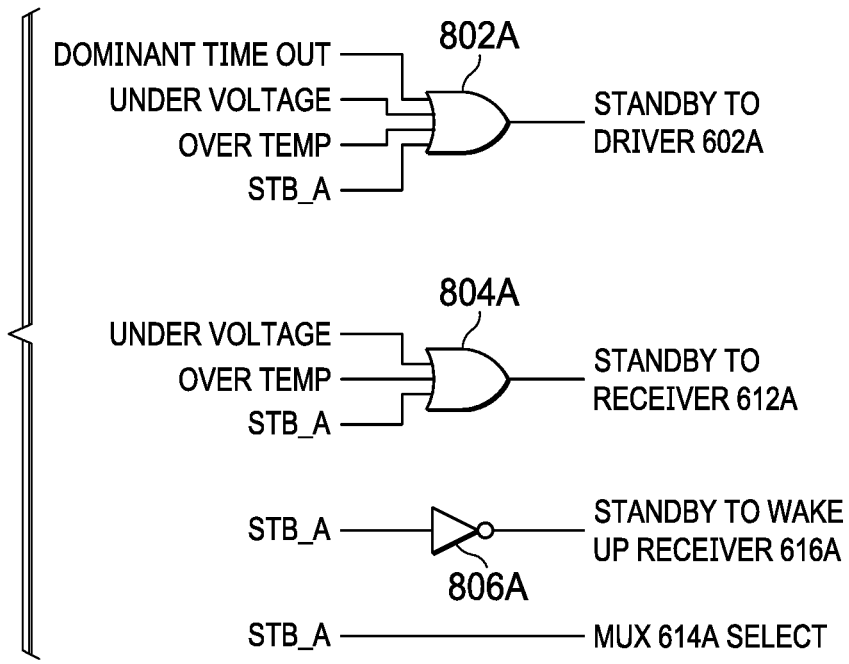
FIGS. 8A and 8B are block diagrams of the mode and control logic of the transceiver integrated circuit of FIG. 6.

FIG. 8A illustrates an example of the mode and control logic block 632A. A four input OR gate 802A receives the STB_A signal and signals from the dominant time out block 604A, an under-voltage detection block and an over-temperature block. The output of the OR gate 802A is the standby signal to driver 602A. A three input OR gate 804A receives the STB_A signal and signals from the under-voltage detection block and the over-temperature block. The output of the OR gate 804A is the standby signal to the receiver 612A. The STB_A signal is provided to an inverter 806A, whose output is the standby signal to the low power wake up receiver 616A. The STB_A signal is provided to the select input of the multiplexer 614A.

Figure 8B:
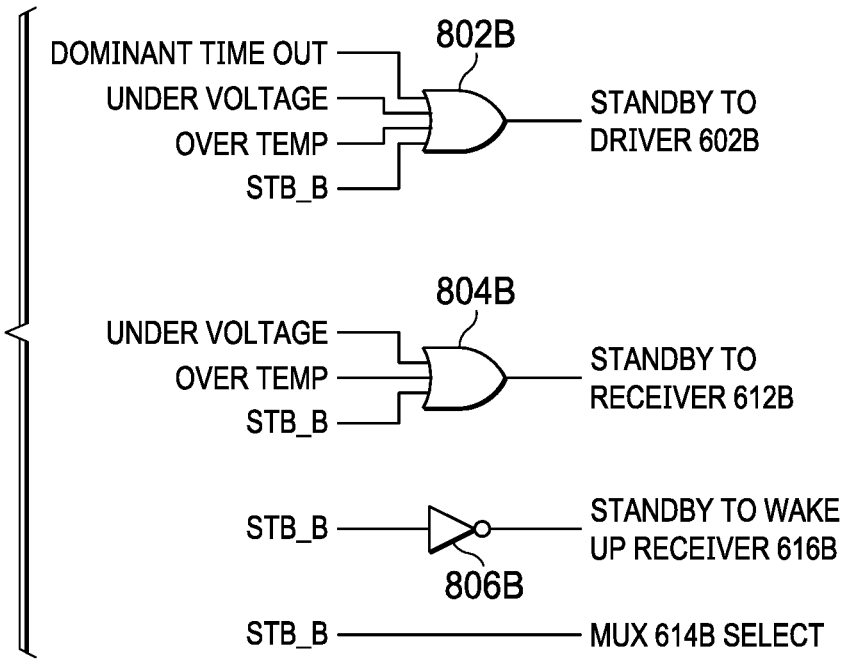

FIG. 8B illustrates an example of the mode and control logic block 632B. A four input OR gate 802B receives the STB_B signal and signals from the dominant time out block 604B, an under-voltage detection block and an over-temperature block. The output of the OR gate 802B is the standby signal to driver 602B. A three input OR gate 804B receives the STB_B signal and signals from the under-voltage detection block and the over-temperature block. The output of the OR gate 804B is the standby signal to the receiver 612B. The STB_B signal is provided to an inverter 806B, whose output is the standby signal to the low power wake up receiver 616B. The STB_B signal is provided to the select input of the multiplexer 614B.

In operation with the AP_EN signal set high for automatic polarity detection, upon power up or reset the transceiver integrated circuit 600 has the drivers 602A, 602B and receivers 612A, 612B all in a standby mode, waiting for detection of a wake up pattern by the relevant WUP logic monitor block 620A, 620B for each individual transceiver. If the low power wake up receiver 616A, 616B is connected opposite or inverted from the proper convention for the CAN bus, then the WUP logic monitor block 620A, 620B only receives a high signal and never detects a wake up pattern. If, however, the low power wake up receiver 616A, 616B is connected in a proper manner in conformance with the actual CAN bus configuration, then that low power wake up receiver 616A, 616B properly passes the CAN bus signals to the WUP logic monitor block 620A, 620B, which upon seeing a wake up pattern, provides a pulse output to the detection and direction control block 630. Upon receiving the wake up detection pulse, the detection and direction control block 630 determines which of the two transceivers 601A, 601B provided the wake up pulse and places that transceiver 601A, 601B into operational state by removing the standby signal from the driver 602A, 602B and the receiver 612A, 612B, providing standby to the low power wake up receiver 616A,616B. The multiplexer 614A, 614B has the select changed to use the output of the low power wake up receiver 616A, 616B. The detection and direction control block 630 maintains the standby signal to the mode and control logic block 632A, 632B of the other transceiver 601A, 601B, which maintains the driver 602A, 602B and the receiver 612A, 612B in standby mode, the low power wake up receiver 616A, 616B active and the select of the multiplexer 614A, 614B selected to the low power wake up receiver 616A, 616B. As polarity has been detected the low power wake up receiver 616A, 616. This maintains the low power wake up receiver 616A, 616B operational, even though the transceiver 601A, 601B is in standby. The power draw of the low power wake up receiver 616A, 616B is low enough that the low power wake up receiver 616A, 616B does not need to be placed in standby mode as well. The output of the logic output 618A, 618B of the active or normal mode transceiver 601A, 601B is provided to the RXD pin.

In a different example, when in automatic polarity detection mode or in master mode based on the AP_EN signal, the low power wake up receiver 616A, 616B of the transceiver 601A, 601B that is placed in standby mode is placed in standby as well to provide that further power reduction. Additional logic is used to allow the low power wake up receiver 616A, 616B to be operational until an automatic polarity determination is made and then the low power wake up receiver 616A, 616B is placed in standby mode.

At power on, if the AP_EN signal is low for master mode operation, transceiver 601B is in standby mode as one input to the NAND gate 705 is low. The transceiver 601A is in normal mode as one input to the AND gate 704 is low. The output of the logic output 618A is provided to the RXD pin.

The examples of FIGS. 6, 7, 8A and 8B do not allow a transceiver 601A, 601B operating in normal mode, either due to the operation of the AP_EN signal being low or being selected as having the correct polarity for the CAN bus, to be placed into a standby mode, unlike the TCAN1042 which can be placed in standby mode when operating by use of the STB pin. In a not shown example, pin 5, the VIO pin in the TCAN1042, can be changed to a standby pin, such as EXT_STB, to allow the transceiver 601A, 601B operating in normal mode to be placed in standby mode to save power. This can be performed by providing an OR gates that receive the STB_A or STB_B signal and the EXT_STB signal and providing the output to the mode and control logic blocks 632A, 632B in place of the STB_A and STB_B signals.

Figure 9A:
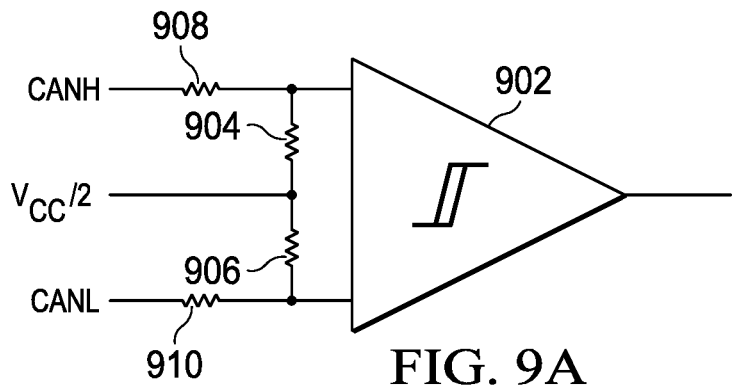
FIG. 9A is a block diagram of a CAN bus receiver.

The ISO 11898-2:2016 specification specifies input impedance for the transceivers. Because of the presence of the dual transceivers 601A, 601B in the transceiver integrated circuit 600, accommodation must be made to maintain the proper input impedance. FIG. 9A illustrates input impedance according to the prior art, such as in the transceiver integrated circuit 300. A receiver 902, such as the receivers 612A, 612B, 616A and 616B, has terminating resistors 904 and 906 across its inputs with the junction point of the resistors 904 and 906 connected to $V_{CC}/2$. An input resistor 908 is connected between the CAN bus high input and one input of the receiver 902 and an input resistor 910 is connected between the CAN bus low input and the other input of the receiver 902. The input resistors 908 and 910 are sized to conform with the ISO 11898-2 specification. Simply placing two copies of the receiver 902 with the input resistors 908 and 910 in parallel would result in an input impedance that is less then specification, approximately by half, due to the effective parallel nature of the input resistors 908 and 910 of the two receivers.

Figure 9B:
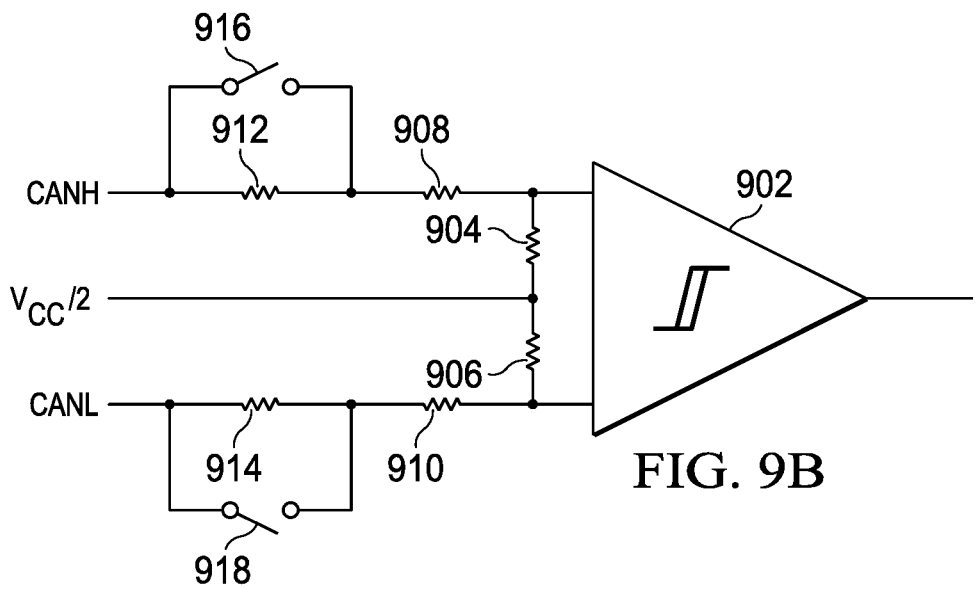
FIG. 9B is a block diagram of a CAN bus receiver.

FIG. 9B illustrates input impedance. Additional resistors 912 and 914 are placed in series with the input resistors 908 and 910. Bypass switches 916 and 918 are used to adjust the input impedance as required. This is a simplified illustration of a programmable resistance ladder so that the input impedance can be properly trimmed for the actual installation. By providing the additional resistance, the parallel nature of the receivers is accommodated and the transceiver integrated circuit 600 maintains input impedance according to the standard.

Figure 10:
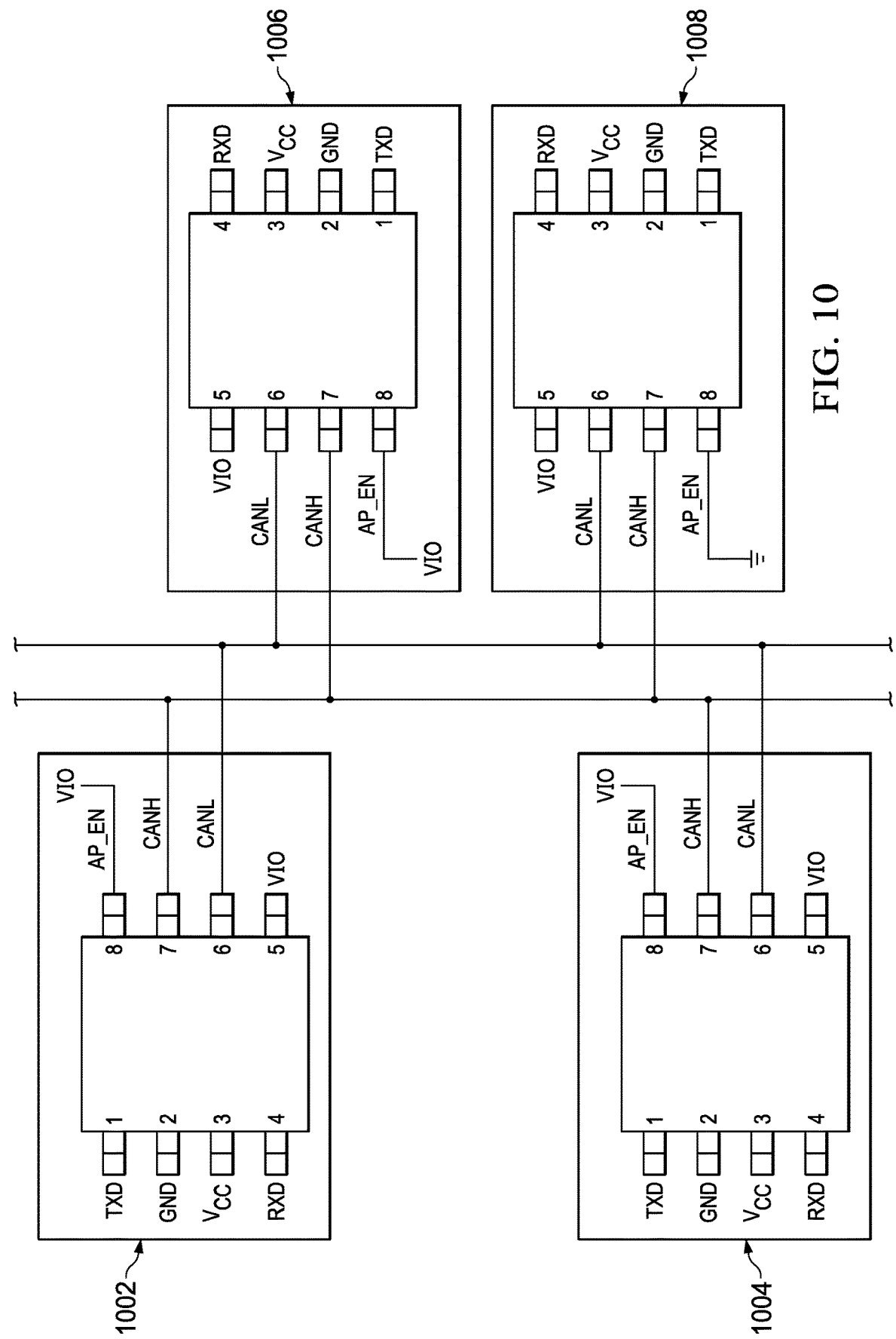
FIG. 10 is a block diagram of a plurality of CAN bus transceiver integrated circuits, with one of the transceiver integrated circuits configured for master operation.

As discussed above, the AP_EN or automatic polarity enable signal is used to designate whether a given transceiver integrated circuit 600 is in auto polarity mode or is in master mode. This is illustrated in the FIG. 10. Transceiver integrated circuits 1002, 1004 and 1006 have the AP_EN input puled high, while transceiver integrated circuit 1008 has the AP_EN input connected to ground. As shown in FIG. 6, connecting the AP_EN input to ground places transceiver integrated circuit 1008 in master mode and not performing automatic polarity determinations. The transceiver integrated circuit 1008 determines the polarity of the signals on the CAN bus. The transceiver integrated circuits 1002, 1004 and 1006 have automatic polarity enabled and therefore behave as described above.

By placing two CAN bus transceiver circuits in a single integrated circuit, inverting the connection to the CAN bus for one of the CAN bus transceiver circuits, detecting which CAN bus transceiver circuit is properly connected to the CAN bus, placing the incorrectly connected CAN bus transceiver circuit into standby and providing additional input resistance to maintain specification compliance, only a single integrated circuit is needed to allow automatic polarity detection and power draw is not increased. This allows substitution into the controller module 200.

While an output from the WUP logic monitor blocks 620A, 628B has been used to control the flip-flops 702A, 702B, in different examples the output of the logic outputs 618A, 618B are provided to the set inputs of the flip-flops 702A, 702B, through an inverter is necessary. This can be done because the output of the logic output 618A, 618B connected in transceiver 601A, 601B connected in the wrong polarity will not provide any pulses and so will not set the wrong polarity flip-flop 702A, 702B. Further, the output of the logic output 618A, 618B connected in transceiver 601A, 601B connected in the correct polarity will provide many transitions during both wake up detection and normal CAN bus operations, these transitions only further provide resets to the correct polarity flip-flop 702A, 702B that has already been reset by the initial wake up pattern detection.

While a specific design has been used to illustrate the items in a CAN bus transceiver, it is understood that variations in specific elements, or even removal of or addition of elements is possible in other designs. For example, alternatives besides bias units 634A, 634B can be used to provide proper voltage levels to the CAN bus. In another example, the dominant time out block 604A, 604B can be omitted.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A control area network (CAN) bus integrated circuit comprising:
    CAN bus high and low terminals;
    a receive data terminal;
    a first CAN bus transceiver having normal and standby modes;
    a second CAN bus transceiver having normal and standby modes;
    output circuitry coupled to the receive data terminal and to the CAN bus high and low terminals, and providing an output CAN bus receive data signal from the one of the first and second CAN bus transceivers in normal mode to the receive data terminal;
    an automatic polarity enable terminal configured to receive an automatic polarity selection signal; and
    direction logic coupled to the automatic polarity enable terminal, wherein the direction logic places the first CAN bus transceiver in normal mode and the second CAN bus transceiver in standby mode when the automatic polarity selection signal indicates that automatic polarity enable is disabled.

2. The CAN bus integrated circuit of claim 1, further comprising a transmit data terminal coupled to the first and second CAN bus.

3. The CAN bus integrated circuit of claim 1, wherein the detection logic includes a first flip-flop and a second flip-flop, the first flip-flop receiving the first wake up logic monitor output and the second flip-flop receiving the second wake up logic monitor output.

4. The CAN bus integrated circuit of claim 1, wherein the first CAN bus transceiver further includes first overtemperature and first under voltage detection modules, each having outputs,
    wherein the second CAN bus transceiver further includes second overtemperature and second under voltage detection modules, each having outputs, and
    wherein the direction logic is coupled to the first overtemperature and first under voltage detection modules outputs and the second overtemperature and second under voltage detection modules outputs and places the first CAN bus transceiver into standby when either of the first overtemperature or first under voltage detection modules outputs indicates an error and places the second CAN bus transceiver into standby when either of the second overtemperature or second under voltage detection modules outputs indicates an error.

5. The CAN bus integrated circuit of claim 1, including an external standby terminal coupled to the direction logic and configured to receive an external standby signal,
    wherein the direction logic places the one of the first and second CAN bus transceivers in normal mode into standby mode when the external standby signal is asserted.

6. A control area network (CAN) bus controller comprising:
    a microcontroller;
    a CAN bus connector for receiving CAN bus high and low lines;
    one of a controller input or a controller output coupled to the microcontroller; and
    a CAN bus integrated circuit coupled to the microcontroller and to the CAN bus connector, the CAN bus integrated circuit including:
    CAN bus high and low terminals coupled to the CAN bus connector;
    a receive data terminal coupled to the microcontroller;
    a first CAN bus transceiver having normal and standby modes;
    a second CAN bus transceiver having normal and standby modes;
    output circuitry coupled to the receive data terminal and providing an output CAN bus receive data signal from the one of the first and second CAN bus transceivers in normal mode to the receive data terminal;
    an automatic polarity enable terminal configured to receive an automatic polarity selection signal; and
    direction logic coupled to the automatic polarity enable terminal, wherein the direction logic places the first CAN bus transceiver in normal mode and the second CAN bus transceiver in standby mode when the automatic polarity selection signal indicates that automatic polarity enable is disable.

7. The CAN bus controller of claim 6, wherein the CAN bus integrated circuit further includes a transmit data terminal coupled to the first and second CAN bus transceivers and to the microcontroller.

8. The CAN bus controller of claim 6, wherein the first CAN bus transceiver further includes first overtemperature and first under voltage detection modules, each having outputs,
    wherein the second CAN bus transceiver further includes second overtemperature and second under voltage detection modules, each having outputs, and
    wherein the direction logic is coupled to the first overtemperature and first under voltage detection modules outputs and the second overtemperature and second under voltage detection modules outputs and places the first CAN bus transceiver into standby when either of the first overtemperature or first under voltage detection modules outputs indicates an error and places the second CAN bus transceiver into standby when either of the second overtemperature or second under voltage detection modules outputs indicates an error.

9. The CAN bus controller of claim 8, wherein the CAN bus integrated circuit further includes an external standby terminal coupled to the direction logic and configured to receive an external standby signal, wherein the direction logic places the one of the first and second CAN bus transceivers in normal mode into standby mode when the external standby signal is asserted.

* * * * *